UNITED STATES PATENT OFFICE.

SAMUEL PEACOCK, OF CHICAGO, ILLINOIS, ASSIGNOR TO THE SOUTHERN ELECTRO-CHEMICAL COMPANY, OF NEW YORK, N. Y., A CORPORATION OF NEW JERSEY.

PROCESS OF MAKING ZINC SULFO-AMID.

1,009,558.     Specification of Letters Patent.     Patented Nov. 21, 1911.

No Drawing.     Application filed July 12, 1910. Serial No. 571,615.

*To all whom it may concern:*

Be it known that I, SAMUEL PEACOCK, a citizen of the United States, residing at Chicago, in the county of Cook and State of Illinois, have invented certain new and useful Improvements in Methods of Producing Sulfo-Amid and By-Products; and I do hereby declare the following to be a full, clear, and exact description of the invention, such as will enable others skilled in the art to which it appertains to make and use the same.

This invention relates to a process of producing zinc-sulfo-amids and by-products, and has for its object the manufacture of these substances in a manner more expeditious and at a less cost than the processes heretofore known.

With these and other objects in view, the invention consists in the novel steps and combinations of steps more fully hereinafter disclosed and particularly pointed out in the claims.

I have discovered when certain sulfids are heated to high temperatures, say above 800° C., but not greatly in excess of 1800° C. and in an atmosphere of nitrogen a complex nitrogenous compound is formed. I have not as yet been able to determine the exact chemical composition of this compound, but the chemical reactions involved are believed to be substantially as follows, when for example zinc sulfid is employed:—

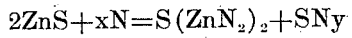

Nor have I been able as yet to determine the exact chemical composition of the sulfur nitrid produced by this process, but zinc-sulfo-amid is clearly the product of the reaction, as will appear below. When this product is made in an electric furnace, however, this amid is the product of the substitution of zinc for hydrogen, according to the following equation.

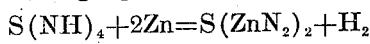

The sulfur nitrid produced is believed to be $N_2S$, for it forms ammonium sulfate when treated with water.

The furnace reactions are invariably incomplete, and therefore give rise to very complex substances whose chemical compositions are exceedingly difficult to determine in the laboratory. Commercially, however, the products of the reactions are valuable, because a nitrogen fixation substance is produced by means of heating sulfids in an atmosphere of nitrogen. The zinc-sulfo-amid is clearly present, for when it is exposed in the soil or is subjected to the action of water combined nitrogen in the form of ammonia makes itself manifest which is a form very desirable as a plant food, and this compound also is useful in other industries in which ammonia is desired.

It is evident that those skilled in the art may vary the details of my process without departing from the spirit of my invention, and therefore I do not wish to be limited to such features except as may be required by the claims.

What I claim is:

1. The process of producing zinc-sulfo-amids which consists in subjecting a zinc sulfid in an atmosphere of nitrogen to a temperature sufficient to cause a zinc-sulfo-amid to be formed, and in suitably recovering said amid, substantially as described.

2. The process of producing zinc-sulfo-amids and sulfur nitrids which consists in subjecting a zinc sulfid in an atmosphere of nitrogen to a temperature sufficient to cause a reaction between said sulfid and said nitrogen, and in suitably separating out the products of the reaction, substantially as described.

3. The process of producing zinc-sulfo-amids and sulfur nitrids which consists in subjecting a sulfid of zinc in an atmosphere of nitrogen to a temperature above 800° C., to cause a reaction between said sulfid and said nitrogen, and in suitably separating out the products of the reaction, substantially as described.

In testimony whereof, I affix my signature, in presence of two witnesses.

SAMUEL PEACOCK.

Witnesses:
R. J. BOYLAN,
T. A. WITHERSPOON.